Patented Feb. 25, 1941

2,232,930

UNITED STATES PATENT OFFICE 2,232,930

POLYSTYRENE SYNTHETIC RESINS

Sylvia M. Stoesser and Robert D. Lowry, Midland, Mich., assignors to The Dow Chemical Company, Midland, Mich., a corporation of Michigan No Drawing. Application October 1, 1938, Serial No. 232,803

4 Claims. (Cl. 260—84)

The present invention relates to certain new co-polymers of styrene with cinnamic acid and to methods of preparing and working such products.

Polymerized styrene, although exhibiting numerous properties which make it a very useful resin, has a number of undesirable characteristics. It is relatively soft, becomes plastic at only moderately elevated temperatures, and has a lower impact strength than is frequently desired. These disadvantages tend to limit its usefulness.

We have now discovered that a mixture of styrene and a small proportion of cinnamic acid may be polymerized to a resin which has the desirable characteristics of polystyrene without the disadvantages mentioned above. This new resin is a clear, substantially colorless material, and is harder, stronger, much tougher, and much less plastic than polystyrene at moderately elevated temperatures. It may be fabricated into useful articles by any of the methods applicable to polystyrene.

In preparing the new resins, a mixture of styrene and a small proportion, i. e. about 0.05 to 10.0 per cent by weight of cinnamic acid, is preferably maintained at a temperature between about 100° C. and 140° C. until the polymerization is complete, usually for three days. The polymerization may, however, be carried out by any of the several other methods employed in preparing polystyrene, e. g. by allowing the mixture to stand for a long period of time at room temperature or thereabouts, by heating the mixture at temperatures above 140° C., by the use of polymerization catalysts such as sulfuric acid or peroxides, etc.

Inasmuch as cinnamic acid cannot be extracted from our new resin, it is believed that the acid is chemically combined with the styrene, and that the resin is a true co-polymer of styrene and cinnamic acid. This belief is substantiated by the fact that the infra-red absorption spectrum of a solution of our resin in carbon tetrachloride is different in kind from that of a similar solution containing a mixture of polystyrene and cinnamic acid. Moreover, when polymerized styrene is merely mixed mechanically with cinnamic acid, e. g. by mastication on hot rolls, the mixture obtained does not possess the desirable properties of our co-polymer.

As hereinbefore mentioned, our new co-polymer possesses a lower plasticity at elevated temperature (i. e. a higher heat-distortion value) and a higher impact strength than polystyrene. In addition, we have found that, in contrast to the behavior of polystyrene, the heat-distortion value of our new co-polymer may be further increased by mechanically working the resin for a short period of time, e. g. 5-30 minutes. This working may be accomplished by any of the methods common in the working of rubber and other plastics, e. g. by mastication on hot rolls, by kneading in a power-mixer, etc. By suitable treatment of this nature, the impact strength of our new co-polymer may be increased by as much as 50 per cent.

The following examples illustrate several ways in which the principle of the invention has been employed, but are not to be construed as limiting the scope thereof.

Example 1

A number of samples of styrene-cinnamic acid mixtures, containing cinnamic acid in the proportions indicated in the following table, were polymerized by heating at 125° C. for three days. The products so obtained were all clear, colorless resins resembling polystyrene in appearance. Each sample was then ground to a fine powder. These powders were carefully dried in a vacuum oven at 80° C., and then compression-molded at 160° C. into test specimens, on which values for tensile strength, impact strength, and heat distortion were measured. The impact strength was measured by a method very similar to the A. S. T. M. standard impact test (D256–34T) on a cantilever beam machine using a rectangular sample 0.100 inch by 0.50 inch with 5/16 inch projection above the jaws of the machine. The heat-distortion was determined by a test similar to A. S. T. M. D–48–33, using a sample 0.100 inch by 0.50 inch. The following table gives the results of these tests:

Table I

| Percent cinnamic acid | Impact strength, inch-pounds | Heat distortion, ° C. | Tensile strength, lbs. per sq. in. |
|---|---|---|---|
| 0 (for comparison) | 0.7 | 80 | 5608 |
| 1 | 1.7 | 83 | 7587 |
| 3 | 1.5 | 85 | 7797 |
| 5 | 1.1 | 88 | 7308 |
| 10 | 1.2 | 77 | 7800 |

Example 2

A number of samples of styrene-cinnamic acid mixtures containing cinnamic acid in the proportions indicated in the following table, were polymerized by heating at 125° C. for three days, and each sample was then ground to a granular powder. The powdered resins were then subjected to mechanical working by mastication on steam-heated rolls for 15 minutes. The worked polymers were then ground to a powder and compression-molded at 160° C. into test specimens, on which values for tensile strength, heat distortion, and impact strength were measured as in Example 1. The following table summarizes these tests:

Table II

| Percent cinnamic acid | Impact strength, inch-pounds | Heat distortion, °C. | Tensile strength, lbs. per sq. in. |
|---|---|---|---|
| 0 (for comparison) | 0.7 | 80 | 6500 |
| 1 | 0.5 | 91 | 6170 |
| 3 | 0.6 | 90 | 7170 |
| 5 | 1.0 | 94 | 8266 |
| 10 | 1.7 | 94 | 7942 |

A comparison of Example 2 with Example 1 shows that the mechanical working of our new co-polymers greatly increases the heat-distortion value thereof, and, in certain instances, the impact strength as well.

Other modes of applying the principle of our invention may be employed instead of those described, change being made as regards the details hereinbefore disclosed, provided the product or method stated by any of the following claims, or the equivalent of such stated product or method, be employed.

We claim:
1. As a new synthetic resin, a co-polymer of styrene and cinnamic acid prepared by heating styrene and between about 0.05 and about 10.0 per cent by weight of cinnamic acid to a temperature between about 100° C. and about 140° C. for a time sufficient to polymerize the same.
2. The method which comprises subjecting a mixture of styrene and between about 0.05 and about 10.0 per cent by weight of cinnamic acid to polymerizing conditions at a temperature below 140° C., whereby a tough, resinous co-polymer of styrene and cinnamic acid is obtained.
3. The method which comprises heating a mixture of styrene and between about 0.05 and about 10.0 per cent of cinnamic acid to a temperature between about 100° C. and about 140° C. to polymerize the same whereby a co-polymer of styrene and cinnamic acid is obtained.
4. The method which comprises subjecting the co-polymer of styrene and cinnamic acid prepared by heating a mixture of styrene and between about 0.05 and about 10.0 per cent by weight of cinnamic acid at a temperature between about 100° C. and 140° C. to a milling operation, whereby the heat-distortion value and the impact strength of the co-polymer are increased.

SYLVIA M. STOESSER.
ROBERT D. LOWRY.